United States Patent
Kawamoto et al.

(10) Patent No.: US 6,803,985 B2
(45) Date of Patent: Oct. 12, 2004

(54) PROCESS FOR PRODUCING OPTICAL ELEMENT, OPTICAL ELEMENT, OPTICAL FILMS USING OPTICAL ELEMENT, AND ILLUMINATOR AND LIQUID CRYSTAL DISPLAY EACH USING OPTICAL ELEMENT OR OPTICAL FILMS

(75) Inventors: Ikuo Kawamoto, Ibaraki (JP);
Hironori Motomura, Ibaraki (JP);
Miki Shiraogawa, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/287,687

(22) Filed: Nov. 5, 2002

(65) Prior Publication Data

US 2003/0090617 A1 May 15, 2003

(30) Foreign Application Priority Data

Nov. 5, 2001  (JP) ................................. P. 2001-339632

(51) Int. Cl.⁷ ................................................. G02F 1/13
(52) U.S. Cl. ........................................ 349/187; 428/1.3
(58) Field of Search ................................ 349/115, 187, 349/96, 97, 98, 117; 428/1.3, 1.31; 252/299.7

(56) References Cited

U.S. PATENT DOCUMENTS 5,825,444 A   10/1998  Broer et al.
6,459,847 B1 * 10/2002  Van De Witte et al. .... 385/147
6,636,291 B2 * 10/2003  Van De Witte et al. .... 349/187
6,645,379 B2 * 11/2003  Gohle et al. ................ 210/232

FOREIGN PATENT DOCUMENTS

| JP | 6-281814 | 10/1994 |
| JP | 11-153712 | 8/1999 |
| JP | 2000-95883 | 4/2000 |
| WO | WO 97/19385 | 5/1997 |

* cited by examiner

*Primary Examiner*—Robert H. Kim
*Assistant Examiner*—David Y. Chung
(74) *Attorney, Agent, or Firm*—Sughrue Mion, PLLC

(57) ABSTRACT

A process for producing an optical element which comprises a polymeric liquid crystal layer having a helically twisted molecular structure and has satisfactory thickness precision and satisfactory optical properties. The process comprises applying a mixed solution containing a polymerizable nematic liquid crystal compound and a polymerizable chiral reagent to an oriented substrate, followed by drying, to orient the liquid crystal compound; and irradiating the mixed solution applied with radiation from the oriented substrate side while maintaining the mixed solution in contact with a gas comprising oxygen to thereby polymerize and cure the mixed solution.

15 Claims, 1 Drawing Sheet

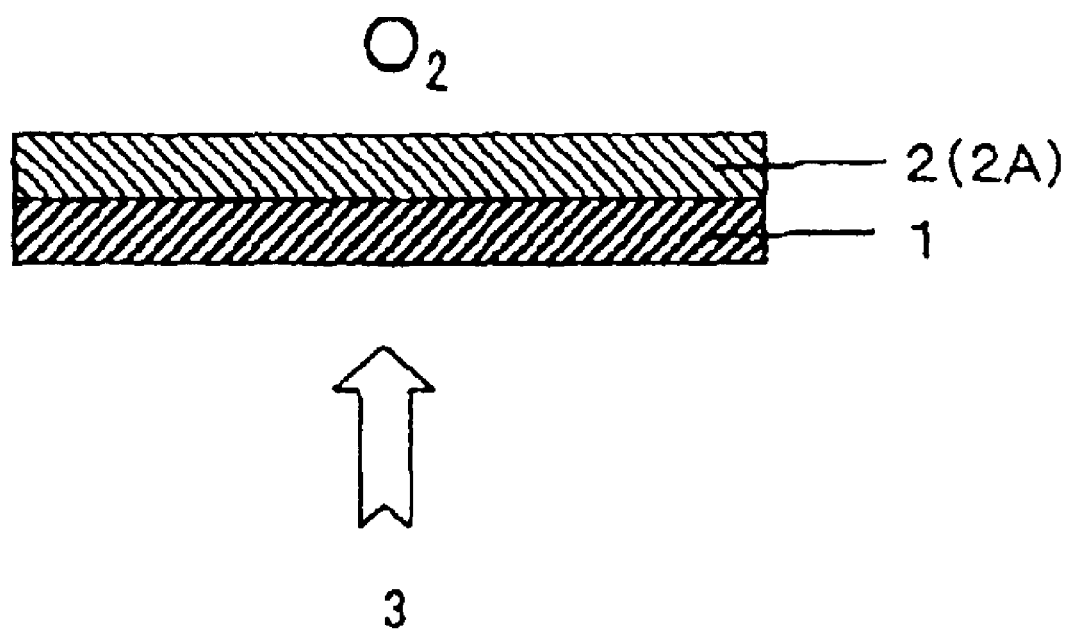

PROCESS FOR PRODUCING OPTICAL ELEMENT, OPTICAL ELEMENT, OPTICAL FILMS USING OPTICAL ELEMENT, AND ILLUMINATOR AND LIQUID CRYSTAL DISPLAY EACH USING OPTICAL ELEMENT OR OPTICAL FILMS

FIELD OF THE INVENTION

The present invention relates to a process for producing an optical element comprising a polymeric liquid crystal layer having a helically twisted molecular structure. The invention further relates to an optical element obtained by the process, optical films using the optical element, and an illuminator and a liquid crystal display each using the optical element or optical films.

DESCRIPTION OF THE RELATED ART

Conventional processes for producing an optical element comprising a polymeric liquid crystal layer having a helically twisted molecular structure include, for example, a process which comprises sandwiching a liquid crystal mixture comprising a polymerizable liquid crystal monomer and a chiral monomer between two parallel oriented substrates, and polymerizing and curing the mixture with ultraviolet rays or the like to produce a cholesteric polarizer having a helically twisted molecular structure (see Japanese Paten Laid-Open No. 6-281814). However, the process disclosed in this publication, in which a liquid crystal mixture sandwiched between two oriented substrates is polymerized, involves poor thickness precision and in-plane unevenness in optical properties due to the poor thickness precision. As a result, this process has disadvantages that brightness improvement is insufficient and front-view hue/slant-view hue characteristics decrease. In addition, there is a problem that a large amount of industrial wastes is unavoidable because of the necessity of oriented substrates on both sides of the liquid crystal mixture.

The cholesteric polarizers actually obtained and reported in the publication cited above have a thickness as large as from 18 to 20 $\mu$m. Such a large product thickness results in poor thickness precision, which causes in-plane unevenness in optical properties. The related art technique hence has disadvantages that brightness improvement is insufficient and front view hue/slant view hue characteristics decrease. Still another problem is that the large product thickness increases the material cost.

Furthermore, the related art process described above requires exposure with an ultraviolet source (365 nm) at an irradiation intensity as extremely low as from about 0.06 to 5 mW/cm² for a period of time as extremely long as from 5 to 60 minutes. This process hence has a considerably poor production efficiency. This related art process adds a dye to the liquid crystal mixture or disposes a spacer along the edges of the alignment substrates, and realizes the spread of a wavelength range of a cholesteric polarizer. In this case, however, orientation properties of the liquid crystal become insufficient and this causes in-plane unevenness in optical properties. This technique hence has the disadvantages that brightness improvement is insufficient and front view hue/slant view hue characteristics decrease. Moreover, in this related art process, the shearing operation with the two substrates for inhibiting the formation of discontinuity is conducted in such a manner that the two substrates are sheared over a short distance until planeness is obtained. This makes it difficult to conduct roll-to-roll production and the process hence has a considerably low production efficiency.

SUMMARY OF THE INVENTION

Accordingly one object of the present invention is to provide a process for producing an optical element which comprises a polymeric liquid crystal layer having a helically twisted molecular structure and has satisfactory thickness precision and satisfactory optical properties.

Another object of the present invention is to provide an optical element obtained by the process.

Still another object of the present invention is to provide optical films using the optical element.

Further object of the present invention is to provide an illuminator and a liquid crystal display each using the optical element or optical film.

As a result of intensive investigations to overcome the problems described above, it has been found that above-described objects can be accomplished with the production process described below. The invention has thus been completed based on this finding.

The present invention provides a process for producing an optical element comprising a polymeric liquid crystal layer having a helically twisted molecular structure, which comprises:

applying a mixed solution containing a polymerizable nematic liquid crystal compound and a polymerizable chiral reagent to an oriented substrate, followed by drying, to orient the mixed solution; and irradiating the mixed solution applied with radiation from the oriented substrate side while maintaining the mixed solution in contact with a gas comprising oxygen to thereby polymerize and cure the mixed solution.

According to the process of the present invention, the mixed solution containing a liquid crystal material is oriented from one side thereof by one oriented substrate and then irradiated with radiation from the side opposite the mixed solution, i.e., from the oriented substrate side, while maintaining the mixed solution in contact with a gas comprising oxygen. This process improves orientation properties of the resulting liquid crystal layer in film thickness direction of the liquid crystal layer, and controls the rate of polymerization and curing by the difference in oxygen concentration. As a result, this process can attain an improvement in thickness precision and, hence, a decease in product thickness. This makes it possible to produce an optical element comprising a polymeric liquid crystal layer having a helically twisted molecular structure in the form of a thin film having a thickness of from 2 to 15 $\mu$m. Further, the improved thickness precision brings about in-plane evenness in optical properties. As a result, brightness-improving characteristics and front view hue/slant view hue characteristics are improved, and this can realize the spread of a wavelength range of an optical element.

Furthermore, the process of the invention, in which one side orientation is conducted, is advantageous in that the amount of oriented substrates required is a half of that necessary in the related art process in which two oriented substrates are used to conduct both sides orientation, and thus attains decrease in the amount of industrial wastes. In addition, since high thickness precision and decreased product thickness can be attained, the cost of liquid crystal materials can be decreased. Still a further advantage of the invention is as follows. For the spread of a wavelength range of a dye-containing system in both-sides orientation embodiment, a certain extent of layer thickness is required for the reason that the rate of crosslinking reaction should be controlled based on light absorption by the dye. In contrast, according to the process of the present invention, orientation properties and thickness precision are improved, and hence, brightness-improving characteristics and front view hue/slant view hue characteristics are improved. Consequently, the optical element can be used in a wider wavelength range with the necessary and minimum thickness, whereby decrease in film cost can be attained. Moreover, roll-to-roll production is possible and improvement in production efficiency can hence be attained.

In the process for producing an optical element, the temperature during the irradiation with radiation is preferably 40° C. or higher. By regulating the temperature during the irradiation with radiation to 40° C. or higher, the liquid crystal material can be polymerized and cured in a satisfactorily oriented state. The temperature during the irradiation with radiation is more preferably from about 50 to 90° C.

In the process for producing an optical element, the gas comprising oxygen preferably has an oxygen concentration of 0.5 vol % or higher. Air is preferably used as the gas.

The irradiation with radiation in the process for optical-element production is preferably conducted at an intensity of from 10 to 1,000 mW/cm$^2$. According to the present invention, when an ultraviolet source (365 nm) is used at an irradiation intensity within the above range, an optical element can be produced through exposure in an extremely short period of time of from 0.1 second to 2 minutes. Thus, optical elements can be produced at an extremely high efficiency. The irradiation intensity is more preferably from 50 to 500 mW/cm$^2$.

In the case where ultraviolet rays are used as the radiation in the process for producing an optical element, the mixed solution preferably contains a polymerization initiator in an amount of from 0.5 to 10% by weight based on the weight of the sum of the polymerizable nematic liquid crystal compound and the polymerizable chiral reagent. In order to polymerize the liquid crystal mixture by ultraviolet irradiation, the mixed solution should contain a polymerization initiator. The amount of the initiator used is preferably in the above range in order to obtain an optical element comprising a polymeric liquid crystal layer having a helically twisted molecular structure, that can be used in a wider wavelength range. The amount of the polymerization initiator used is preferably from 1 to 9% by weight, more preferably from 3 to 7% by weight.

In the process for producing an optical element, the polymerizable nematic liquid crystal compound is preferably a compound having one or more polymerizable functional groups, and the polymerizable chiral reagent is preferably a compound having polymerizable functional groups in a larger number than the polymerizable functional groups of the polymerizable nematic liquid crystal compound. When a polymerizable nematic liquid crystal compound and a polymerizable chiral reagent which satisfy that relationship with respect to the number of polymerizable functional groups are used, an optical element comprising a polymeric liquid crystal layer having a helically twisted molecular structure having higher suitability for a wider wavelength range can be obtained due to a difference in reactivity during the irradiation step. For example, when the polymerizable nematic liquid crystal compound is a compound having one polymerizable functional group, the polymerizable chiral reagent is preferably a compound having two or more polymerizable functional groups.

In the process for producing an optical element, the helically twisted molecular structure of the polymeric liquid crystal layer preferably has a difference in pitch between a part thereof on the side facing the oriented substrate and a part thereof on the opposite side. Furthermore, the pitch of the helically twisted molecular structure of the polymeric liquid crystal layer preferably changes so that the difference between the maximum pitch and the minimum pitch is at least 100 nm. By regulating the helically twisted molecular structure so that the pitch in a part thereof on the side facing the oriented substrate differs from the pitch in a part thereof on the opposite side, the polymeric liquid crystal layer can have suitability for a wider wavelength range. When the difference between the maximum and minimum pitches is regulated to that value, an optical element comprising a polymeric liquid crystal layer having a helically twisted molecular structure having especially high suitability for a wider wavelength range is obtained. The polymeric liquid crystal layer is preferably one which has uniform optical properties and in which the pitch of the helix gradually changes continuously from the minimum value for one side of the layer to the maximum value for the other side of the layer. This change in pitch exerts a favorable influence on the strength of the layer.

The present invention further provides an optical element obtained by the process for optical element production described above. The optical element obtained is used as, for example, a selective reflection type polarizing optical element. Other uses of the optical element include a retardation film (optical compensating film), twisted retardation film, and oblique retardation film.

The present invention furthermore provides an optical film (cholesteric polarizer) comprising a combination of the optical element and a retardation film, and an optical film comprising a combination of the optical element and an absorbing polarizer film.

The selective reflection type polarizing optical element or the like or an optical film using the same can be used in an illuminator which comprises a surface light source having a reflecting layer on the back side thereof. In this illuminator, the optical element or optical film is disposed on the front side of the surface light source. The illuminator preferably has at least one prism array layer. This illuminator preferably has two or more prism array layers disposed so that the direction of array arrangement in one of the layers intersects that in the adjacent layer(s).

The present invention still further provides a liquid crystal display which comprises the illuminator and a liquid crystal cell disposed on the light emission side of the illuminator. In each of the optical films, illuminator, and liquid crystal display described above, all or part of the constituent layers may have been tightly bonded through an adhesive layer.

BRIEF DESCRIPTION OF THE DRAWING

The foregoing and other objects and advantages of the invention will be apparent from the following detailed description and the accompanying drawing, in which the FIGURE is a diagrammatic view illustrating a step in the process of the invention for producing an optical element.

DESCRIPTION OF THE PREFERRED EMBODIMENTS

The temperature used herein means an "atmosphere" temperature.

Examples of the polymerizable nematic liquid crystal compound include compounds which have both at least one polymerizable functional group and a mesogenic group comprising a cyclic or another unit. Examples of the polymerizable functional group include acryloyl, methacryloyl, epoxy, and vinyl ether groups. Of those, acryloyl and methacryloyl are preferable. A polymerizable nematic liquid crystal compound having two or more polymerizable functional groups may be used to incorporate a crosslinked structure and thereby improve durability. Examples of the cyclic unit serving as a mesogenic group include biphenyl, phenylbenzoate, phenylcyclohexane, azoxybenzene, azomethine, azobenzene, phenylpyrimidine, diphenylacetylene, diphenylbenzoate, bicyclohexane, cyclohexylbenzene, and terphenyl systems. These cyclic units may have, at an end thereof, a substituent such as a cyano, alkyl, or alkoxy group or a halogen atom. The mesogenic group may be bonded through a spacer part for imparting flexibility. Examples of the spacer part include a polymethylene chain and a polyoxymethylene chain. The number of repetitions of the structural unit constituting such a spacer part may be suitably determined according to the chemical structure of the mesogenic group. However, the number of repeating units constituting the polymethylene chain is generally from 0 to 20, preferably from 2 to 12, and that of repeating units constituting the polyoxymethylene chain is generally from 0 to 10, preferably from 1 to 3.

The polymerizable chiral reagent is not particularly limited so long as it has at least one polymerizable functional group and an optically active group and does not disorder the orientation of the polymerizable nematic liquid crystal compound. Examples of the polymerizable functional group include acryloyl, methacryloyl, epoxy, and vinyl ether groups. Of those, acryloyl and methacryloyl are preferable. Although the polymerizable chiral reagent may be one having liquid crystal properties or one having no liquid crystal properties, it is preferred to use one showing cholesteric liquid crystal properties.

The amount of the polymerizable chiral reagent added influences the pitch, which determines the selective reflection wavelength. Consequently, colors can be regulated based on selective reflection wavelength by controlling the amount of the chiral reagent added. The amount of the polymerizable chiral reagent incorporated is generally form about 1 to 30 parts by weight, preferably from about 2 to 20 parts by weight, per 100 parts by weight of the polymerizable nematic liquid crystal compound.

In the case where the mixture solution containing a polymerizable nematic liquid crystal compound and a polymerizable chiral reagent is irradiated with ultraviolet rays, this mixture solution contains a photopolymerization initiator. Various photopolymerization initiators can be used without particular limitations. Examples thereof include Irgacure 907, 184, 651, and 369, manufactured by Ciba Specialty Chemicals. Co.

Examples of solvents which can be generally used for preparing the mixture solution include halogenated hydrocarbons such as chloroform, dichloromethane, dichloroethane, tetrachloroethane, trichloroethylene, tetrachloroethylene, and chlorobenzene; phenol and derivatives thereof such as p-chlorophenol; aromatic hydrocarbons such as benzene, toluene, xylene, methoxybenzene, and 1,2-dimethoxybenzene; and other compounds such as acetone, ethyl acetate, tert-butyl alcohol, glycerol, ethylene glycol, triethylene glycol, ethylene glycol monomethyl ether, diethylene glycol dimethyl ether, ethyl Cellosolve, butyl Cellosolve, 2-pyrrolidone, N-methyl-2-pyrrolidone, pyridine, triethylamine, tetrahydrofuran, dimethylformamide, dimethylacetamide, dimethyl sulfoxide, acetonitrile, butyronitrile, and carbon disulfide. The concentration of the solution cannot be unconditionally specified because it depends on the solubility of the thermotropic liquid crystal compound and the thickness of the desired optical film finally obtained. However, the concentration thereof is generally from about 3 to 50% by weight.

In the process of the invention, the mixed solution 2 containing a polymerizable nematic liquid crystal compound and a polymerizable chiral reagent is applied to an oriented substrate 1 as shown in the FIGURE, and the liquid crystal compound is oriented. Subsequently, the mixed solution 2 is irradiated with radiation 3 from the oriented substrate side while maintaining the mixed solution in contact with a gas comprising oxygen to thereby polymerize and cure the mixed solution 2. Thus, a polymeric liquid crystal layer (cholesteric liquid crystal layer) 2a having a helically twisted molecular structure is obtained.

The oriented substrate can use conventional substrates. Examples thereof include a rubbed film obtained by forming a thin film of a polyimide, poly(vinyl alcohol), or the like on a base and rubbing the surface of the thin film with a rayon cloth or the like; a film coated by oblique vapor deposition; an optically prepared oriented film obtained by irradiating either a polymer having a photocrosslinkable group, such as a cinnamate or azobenzene, or a polyimide with polarized ultraviolet; and a stretched film. It is also possible to orient the liquid crystal compound by means of a magnetic field or electric field or by applying a shearing stress. The base may use a film made of a plastic such as poly(ethylene terephthalate), triacetyl cellulose, norbornene resin, poly (vinyl alcohol), polyimide, polyarylate, polycarbonate, polysulfone, or polyethersulfone or a glass plate.

For applying the mixed solution to the oriented substrate, roll coating method, gravure coating method, spin coating method, bar coating method, or the like can be used. After application of the mixed solution, the solvent is removed to form a liquid crystal layer on the substrate. Conditions for solvent removal are not particularly limited so long as the solvent can be mostly removed and the liquid crystal layer formed neither flows nor sags. Usually, the solvent is removed by drying at room temperature, drying in a drying oven, heating on a hot plate, or by another technique.

Subsequently, the liquid crystal layer formed on the oriented substrate is brought into a liquid crystal state and oriented to form a cholesteric structure. For example, the liquid crystal layer is heated to a temperature in the liquid crystal temperature range. For this heat treatment, the same methods as the drying methods shown above can be used. The temperature for this heat treatment cannot be unconditionally specified because it varies depending on the kind of the liquid crystal material or oriented substrate. However, the heat treatment is conducted generally at from 60 to 300° C., preferably from 70 to 200° C. The heat treatment time cannot be unconditionally specified because it varies depending on the heat treatment temperature and the kind of the liquid crystal compound or oriented substrate used. However, the heat treatment time is selected in the range of generally from 10 seconds to 2 hours, preferably from 20 seconds to 30 minutes.

The layer of the liquid crystal oriented is subsequently irradiated with radiation preferably at a temperature of 40°

C. or higher to polymerize and cure the polymerizable nematic liquid crystal compound and the polymerizable chiral reagent. Radiation used is ultraviolet rays, X-rays, γ-rays, electron beams, or the like. Thus, an optical element comprising the resulting polymeric liquid crystal layer having a helically twisted molecular structure is obtained. This optical element may be used without being separated from the oriented substrate, or may be separated from the oriented substrate before use.

The present invention will be explained below in more detail by reference to the following Examples and Comparative Examples, but the invention should not be construed as being limited to those Examples.

PRODUCTION EXAMPLE 1
Preparation of Oriented Substrate

A poly(vinyl alcohol) oriented film having a thickness of 0.1 μm was formed on a triacetyl cellulose (TAC) film having a thickness of 50 μm. This oriented film was subjected to a rubbing treatment to obtain an oriented substrate.

PRODUCTION EXAMPLE 2
Preparation of Mixed Solution

A monofunctional, acrylic, nematic liquid crystal monomer showing liquid crystal properties in the temperature range of from 80 to 210° C. was mixed with a bifunctional acrylic chiral reagent in a ratio of 95:5 by weight. This mixture was dissolved in a solvent (methyl ethyl ketone) so as to achieve a concentration of about 33% by weight. A polymerization initiator was added thereto in an amount of 5% by weight based on the weight of the sum of the monomer and the chiral reagent. Thus, a mixed solution A was prepared.

PRODUCTION EXAMPLE 3
Preparation of Mixed Solution

A bifunctional, acrylic, nematic liquid crystal monomer showing liquid crystal properties in the temperature range of from 80 to 210° C. was mixed with a bifunctional acrylic chiral reagent in a ratio of 95:5 by weight. This mixture was dissolved in a solvent (methyl ethyl ketone) so as to acheive a concentration of about 33% by weight. A polymerization initiator was added thereto in an amount of 5% by weight based on the weight of the sum of the monomer and the chiral reagent. Thus, a mixed solution B was prepared.

Comparative Example 1
Embodiment without Contact with Oxygen

The mixed solution A was sandwiched between the two oriented substrates (orientation treatment sides) and the solvent was removed by volatilization. Thereafter, this structure was heated to 120° C. to orient the liquid crystal and then irradiated with 100 mW/cm² ultraviolet rays at 60° C. for 2 seconds using a metal halide lamp. Thus, a thin film was obtained. This thin film had a thickness of 5 μm.

Comparative Example 2
Embodiment of Irradiation from Side Opposite Oriented Substrate The mixed solution A was applied to the oriented substrate (orientation treatment side) and the solvent was removed by volatilization. Thereafter, the coated substrate was heated to 120° C. to orient the liquid crystal and then irradiated, from the side opposite the oriented substrate, with 100 mW/cm² ultraviolet rays at 60° C. in air for 2 seconds using a metal halide lamp. Thus, a thin film was obtained. This film had a thickness of 5 μm.

EXAMPLE 1

The mixed solution B was applied to the oriented substrate (orientation treatment side) and the solvent was removed by volatilization. Thereafter, the coated substrate was heated to 120° C. to align the liquid crystal and then irradiated, from the oriented substrate side, with 100 mW/cm² ultraviolet rays at 60° C. in air for 2 seconds using a metal halide lamp. Thus, a thin film was obtained. This film had a thickness of 5 μm.

EXAMPLE 2

A thin film having a thickness of 5 μm was obtained in the same manner as in Example 1, except that the mixes solution A was used in place of the mixed solution B (provided that the polymerization initiator amount in the monomer solution A was 7% by weight).

EXAMPLE 3

A thin film having a thickness of 5 μm was obtained in the same manner as in Example 1, except that the mixed solution A was used in place of the mixed solution B.

EXAMPLE 4

A thin film having a thickness of 5 μm was obtained in the same manner as in Example 1, except that the mixed solution A was used in place of the mixed solution B (provided that the polymerization initiator amount in the monomer solution A was 3% by weight).

Evaluation Test

Each of the thin films obtained in Comparative Examples 1 and 2 and Examples 1 to 4 was examined for reflection spectrum with a spectrophotometer (instantaneous multi-photometric system MCPD-2000, manufactured by Otsuka Denshi Co., Ltd.) to determine the half band width Δλ (width of the reflection range at a reflectance which was a half of the maximum reflectance). The results obtained are shown in the Table below.

The nematic liquid crystal monomer used in the Comparative Examples and Examples had an average refractive index n {(ordinary-light refractive index)+(extraordinary-light refractive index)/2} of 1.5 and a Δn {(extraordinary-light refractive index)−(ordinary-light refractive index)} of 0.2. The nematic liquid crystal monomer and chiral reagent used in the Comparative Examples and Examples, when mixed in such a proportion that the (nematic liquid crystal monomer)/(chiral reagent) ratio is 95/5 by weight, gives a reflection spectrum having a central wavelength of 500 nm. Cholesteric helix pitch p and half band width Δλ are represented by formulae λ=n×p and Δλ=Δ n·p. Theoretically, when the central wavelength is 500 nm as in the case shown above, the cholesteric helix pitch p is 320 nm and the half band width Δλ is 67 nm.

TABLE

|  | Comparative Example 1 | Comparative Example 2 | Example 1 | Example 2 | Example 3 | Example 4 |
|---|---|---|---|---|---|---|
| Δ λ (nm) | 64 | 78 | 135 | 212 | 296 | 135 |
| Oriented substrate | Both sides | One side | One side | One side | One side | One side |
| Direction of irradiation | Substrate side | Solution | Substrate side | Substrate side | Substrate side | Substrate side |
| Oxygen | Absent | Present | Present | Present | Present | Present |
| Kind of mixed Solution | A | A | B | A | A | A |
| Amount of polymerization initiator (%) | 5 | 5 | 5 | 7 | 5 | 3 |

The results shown in the above Table show the following. In the thin films obtained in the Comparative Examples, the values of half band width Δλ were almost in agreement with the theoretical value. In contrast, in the thin films obtained in the Examples, the values of half band width Δλ exceeded 100 nm and were far larger than the theoretical value. It was ascertained that even when the thin films formed had a thickness as small as 5 μm, they functioned as optical elements comprising a polymeric liquid crystal layer having a helically twisted molecular structure and having satisfactory thickness precision and satisfactory optical properties. It was also ascertained that the reflection wavelength range can be further widened by regulating the amount of the polymerization initiator or regulating the number of polymerizable functional groups in the nematic liquid crystal monomer or chiral reagent.

What is claimed is:

1. A process for producing an optical element comprising a polymeric liquid crystal layer having a helically twisted molecular structure, said process comprising:

applying a mixed solution containing a polymerizable nematic liquid crystal compound and a polymerizable chiral reagent to an oriented substrate, followed by drying, to orient the mixed solution; and irradiating the mixed solution applied with radiation from the oriented substrate side while maintaining the mixed solution in contact with a gas comprising oxygen to thereby polymerize and cure the mixed solution.

2. The process for producing an optical element as claimed in claim 1, wherein the irradiation with radiation is conducted at a temperature of 40° C. or higher.

3. The process for producing an optical element as claimed in claim 1, wherein the gas comprising oxygen has an oxygen concentration of 0.5% or higher.

4. The process for producing an optical element as claimed in claim 1, wherein the irradiation with a radiation is conducted at an intensity of from 10 to 1,000 mW/cm$^2$.

5. The process for producing an optical element as claimed in claim 1, wherein the radiation is ultraviolet rays and the mixed solution contains a polymerization initiator in an amount of from 0.5 to 10% by weight based on weight of the sum of the polymerizable nematic liquid crystal compound and the polymerizable chiral reagent.

6. The process for producing an optical element as claimed in claim 1, wherein the polymerizable nematic liquid crystal compound is a compound having one or more polymerizable functional groups, and the polymerizable chiral reagent is a compound having polymerizable functional groups of the number larger than the number of the polymerizable functional groups of the polymerizable nematic liquid crystal compound.

7. The process for producing an optical element as claimed in claim 1, wherein the helically twisted molecular structure of the polymeric liquid crystal layer has a difference in pitch between a part thereof on the side facing the oriented substrate and a part thereof on the opposite side.

8. The process for producing an optical element as claimed in claim 7, wherein the pitch of the helically twisted molecular structure of the polymeric liquid crystal layer changes so that the difference between the maximum pitch and the minimum pitch is at least 100 nm.

9. An optical element obtained by the process as claimed in claim 1.

10. An optical film comprising the optical element as claimed in claim 9 and a retardation film.

11. An optical film comprising the optical element as claimed in claim 9 and an absorbing polarizer film.

12. An illuminator comprising a surface light source having a reflecting layer on the back side thereof and, disposed on the front side thereof, the optical element as claimed in claim 9 or the optical film as claimed in claim 10 or 11.

13. The illuminator as claimed in claim 12, which has at least one prism array layer.

14. The illuminator as claimed in claim 13, which has two or more prism array layers, the direction of array arrangement in one of the layers intersecting that in the adjacent layers.

15. A liquid crystal display comprising the illuminator as claimed in claim 12 and a liquid crystal cell disposed on the light emission side of the illuminator.

* * * * *